(12) United States Patent
Gundavelli et al.

(10) Patent No.: US 8,165,290 B2
(45) Date of Patent: *Apr. 24, 2012

(54) METHODS AND APPARATUS FOR BOOTSTRAPPING MOBILE-FOREIGN AND FOREIGN-HOME AUTHENTICATION KEYS IN MOBILE IP

(75) Inventors: Srinath Gundavelli, San Jose, CA (US); Kent Leung, Mountain View, CA (US); Alpesh Patel, Pleasanton, CA (US)

(73) Assignee: Cisco Technology, Inc., San Jose, CA (US)

(*) Notice: Subject to any disclaimer, the term of this patent is extended or adjusted under 35 U.S.C. 154(b) by 93 days.

This patent is subject to a terminal disclaimer.

(21) Appl. No.: 12/645,286

(22) Filed: Dec. 22, 2009

(65) Prior Publication Data

US 2010/0166179 A1 Jul. 1, 2010

Related U.S. Application Data

(63) Continuation of application No. 10/951,499, filed on Sep. 27, 2004, now Pat. No. 7,639,802.

(51) Int. Cl.
*H04L 29/06* (2006.01)
(52) U.S. Cl. .......................................... 380/44; 380/247
(58) Field of Classification Search .................. 380/247, 380/249, 270; 713/179
See application file for complete search history.

(56) References Cited

U.S. PATENT DOCUMENTS

| | | | |
|---|---|---|---|
| 4,692,918 A | 9/1987 | Elliott et al. | |
| 5,016,244 A | 5/1991 | Massey et al. | |
| 5,018,133 A | 5/1991 | Tsukakoshi et al. | |
| 5,218,600 A | 6/1993 | Schenkyr et al. | |
| 5,371,852 A | 12/1994 | Attanasio et al. | |
| 5,473,599 A | 12/1995 | Li et al. | |
| 5,793,762 A | 8/1998 | Penners et al. | |
| 6,119,160 A | 9/2000 | Zhang et al. | |
| 6,148,074 A | 11/2000 | Miloslavsky et al. | |
| 6,148,405 A | 11/2000 | Liao et al. | |
| 6,230,012 B1 * | 5/2001 | Willkie et al. | 455/435.1 |
| 6,339,830 B1 | 1/2002 | See et al. | |
| 6,377,982 B1 | 4/2002 | Rai et al. | |
| 6,466,964 B1 | 10/2002 | Leung et al. | |

(Continued)

FOREIGN PATENT DOCUMENTS

CH 694678 5/2005

(Continued)

OTHER PUBLICATIONS

Release notes for 3Com Corporation, "Conducting a Redundant Route for Network Resiliency," Mar. 1994, NET Builder Family Bridge/Router pp. 26-29.

(Continued)

*Primary Examiner* — Eleni Shiferaw
*Assistant Examiner* — Ali Abyaneh
(74) *Attorney, Agent, or Firm* — Weaver Austin Villeneuve & Sampson LLP

(57) ABSTRACT

Methods and apparatus for dynamically generating authentication keys are disclosed. Specifically, a Mobile-Foreign authentication key is separately generated by both the Mobile Node and Foreign Agent. Similarly, a Foreign-Home authentication key is separately generated by the Foreign Agent and the Home Agent. In accordance with one embodiment, generation of the Mobile-Foreign authentication key and Foreign-Home authentication key are accomplished via the Diffie-Hellman key generation scheme.

23 Claims, 5 Drawing Sheets

U.S. PATENT DOCUMENTS

| | | | |
|---|---|---|---|
| 6,487,605 B1 | 11/2002 | Leung | |
| 6,535,493 B1 | 3/2003 | Lee et al. | |
| 6,560,217 B1 | 5/2003 | Peirce, Jr. et al. | |
| 6,728,536 B1 | 4/2004 | Basilier et al. | |
| 6,760,444 B1 | 7/2004 | Leung | |
| 6,785,823 B1 | 8/2004 | Abrol et al. | |
| 6,795,857 B1 | 9/2004 | Leung et al. | |
| 6,879,690 B2 * | 4/2005 | Faccin et al. | 380/247 |
| 6,907,016 B2 | 6/2005 | Madour et al. | |
| 6,947,725 B2 | 9/2005 | Aura | |
| 6,956,846 B2 | 10/2005 | Lewis et al. | |
| 6,980,802 B2 | 12/2005 | Jung | |
| 7,003,282 B1 | 2/2006 | Ekberg | |
| 7,039,404 B2 | 5/2006 | Das et al. | |
| 7,042,879 B2 | 5/2006 | Eschbach et al. | |
| 7,061,887 B2 | 6/2006 | Fan | |
| 7,065,067 B2 | 6/2006 | Song et al. | |
| 7,073,066 B1 | 7/2006 | Nessett | |
| 7,107,051 B1 | 9/2006 | Walker | |
| 7,107,620 B2 | 9/2006 | Haverinen et al. | |
| 7,158,777 B2 | 1/2007 | Lee et al. | |
| 7,168,090 B2 | 1/2007 | Leung | |
| 7,181,196 B2 | 2/2007 | Patel | |
| 7,218,609 B2 | 5/2007 | Borella et al. | |
| 7,224,673 B1 | 5/2007 | Leung et al. | |
| 7,286,520 B2 | 10/2007 | Takeda et al. | |
| 7,298,847 B2 * | 11/2007 | Jing et al. | 380/247 |
| 7,320,070 B2 | 1/2008 | Baum | |
| 7,389,412 B2 | 6/2008 | Sharma et al. | |
| 7,409,549 B1 | 8/2008 | Leung et al. | |
| 7,475,241 B2 | 1/2009 | Patel et al. | |
| 7,502,331 B2 | 3/2009 | Dommety et al. | |
| 7,626,963 B2 | 12/2009 | Patel et al. | |
| 7,639,802 B2 | 12/2009 | Gundavelli | |
| 2002/0120844 A1 | 8/2002 | Faccin et al. | |
| 2002/0147820 A1 | 10/2002 | Yokote | |
| 2003/0005280 A1 | 1/2003 | Bobde et al. | |
| 2003/0028763 A1 | 2/2003 | Malinen et al. | |
| 2003/0069990 A1* | 4/2003 | D'Annunzio et al. | 709/242 |
| 2003/0115468 A1 | 6/2003 | Aull et al. | |
| 2004/0103282 A1 | 5/2004 | Meier et al. | |
| 2004/0114558 A1 | 6/2004 | Krishnamurthi et al. | |
| 2004/0162105 A1 | 8/2004 | Reddy et al. | |
| 2004/0234075 A1 | 11/2004 | Leung | |
| 2005/0010780 A1 | 1/2005 | Kane et al. | |
| 2005/0025091 A1 | 2/2005 | Patel et al. | |
| 2005/0083905 A1 | 4/2005 | Nishida et al. | |
| 2005/0102522 A1 | 5/2005 | Kanda | |
| 2005/0135622 A1 | 6/2005 | Fors et al. | |
| 2005/0135624 A1 | 6/2005 | Tsai et al. | |
| 2005/0138355 A1 | 6/2005 | Chen et al. | |
| 2005/0177515 A1 | 8/2005 | Kalavade et al. | |
| 2005/0177723 A1 | 8/2005 | Huang et al. | |
| 2006/0046693 A1 | 3/2006 | Tran et al. | |
| 2006/0072759 A1 | 4/2006 | Gundavelli et al. | |
| 2006/0104247 A1 | 5/2006 | Dommety et al. | |
| 2007/0091843 A1 | 4/2007 | Patel et al. | |
| 2007/0124592 A1 | 5/2007 | Oyama | |
| 2007/0230453 A1 | 10/2007 | Giaretta et al. | |
| 2007/0274266 A1 | 11/2007 | Oyama | |
| 2009/0144809 A1 | 6/2009 | Dommety et al. | |

FOREIGN PATENT DOCUMENTS

| | | |
|---|---|---|
| EP | 1 139 634 | 10/2001 |
| WO | WO 01/76134 | 10/2001 |
| WO | WO 02/069605 | 9/2002 |

OTHER PUBLICATIONS

Glass, et al., Network Working Group Request for Comments: 2977, pp. 1-27, The Internet Society, Oct. 2000.

Haverinen, et al., "Authentication and Key Generation for Mobile IP using GSM Authentication and Roaming", ICC 2001. 2001 IEEE International Conference on Communications, New York: IEEE; US vol. 8, Jun. 11, 2001, pp. 2453-2457, XP010553567.

Haverinen, et al., GSM SIM Authentication and Key Generation for Mobile IP draft-haverinen-mobileip-gsmsim-02.txt, Mobile IP Working Group, Nokia, Internet Draft, Apr. 2001, 20 pgs.

Perkins, "Mobile IP", IEEE Communications Magazine, pp. 66-82, May 2002.

Rigney, RFC 2139 "RADIUS Accounting," Livingston, pp. 1-25, Apr. 1997.

PCT International Search Report dated Jun. 29, 2004, from Int'l Appl. No. PCT/US03/36850.

AU Office Action dated May 2, 2008, from AU Appl. No. 2003294330.

CA Office Action dated Jan. 6, 2009, from CA Appl. No. 2,506,670.

CN Office Action dated Sep. 5, 2008, from CN Appl. No. 200380103939.0.

CN Second Office Action dated Feb. 20, 2009, from CN Appl. No. 200380103939.0.

CN Third Office Action dated Jun. 19, 2009, from CN Appl. No. 200380103939.0.

EP Extended Search Report dated Jan. 9, 2009, from EP Appl. No. 06817346.7.

US Office Action mailed Oct. 16, 2008, from U.S. Appl. No. 10/328,522.

US Final Office Action mailed Oct. 2, 2009, from U.S. Appl. No. 10/328,522.

US Notice of Allowance dated May 24, 2010, from U.S. Appl. No. 10/328,522.

US Notice of Allowance and Allowed Claims dated Aug. 29, 2008, from U.S. Appl. No. 10/635,882.

US Office Action mailed Oct. 14, 2008, from U.S. Appl. No. 10/951,499.

US Notice of Allowance dated Aug. 12, 2009, from U.S. Appl. No. 10/951,499.

US Notice of Allowance dated Oct. 23, 2008, from U.S. Appl. No. 10/992,435.

US Office Action mailed Aug. 6, 2008, from U.S. Appl. No. 11/258,720.

US Office Action mailed Feb. 13, 2009, from U.S. Appl. No. 11/258,720.

US Notice of Allowance dated Jul. 24, 2009, from U.S. Appl. No. 11/258,720.

J. Moy, RFC 1247 "OSPF Version 2," Jul. 19, 1991.

Adoba et al., "The Network Access Identifier" RFC 2486, Jan. 1999.

D. Oran, RFC 1142 "OSI IS-IS Intra-domain Routing Protocol," Feb. 1990.

Uyless Black, "TCP/IP and Related Protocols," 1992, *McGraw-Hill, Inc.*, pp. 226-249.

T. Li, et al., RFC 2281 "Cisco Hot Standby Router Protocol (HSRP)," Mar. 1998.

Calhoun et al., "Diameter Base Protocol," RFC 3588, Sep. 2003.

C. Perkins et al., "Authentication, Authorization, and Accounting (AAA) Registration Keys for Mobile IPv4," RFC 3957, Mar. 2005.

Chambless, et al., "Home Agent Redundancy Protocol (HARP)," Oct. 27, 1997.

C. Perkins, "IP Mobility Support," RFC 2002, IBM Corporation, Oct. 1996.

K. Leung et al. U.S. Appl. No. 10/866,654, "Mobile IP Authentication" filed on Nov. 25, 2004; Publ. 2004/0234075.

"Mobile IP," Release 12.0(1)T, pp. 1-55 on or before Jul. 25, 2002.

Montenegro, G., RFC 2344, "Reverse Tunneling for Mobile IP," Sun Microsystems, Inc., May 1998.

D. Harkins and D. Carrel, "The Internet Key Exchange (IKE)," Cisco Systems, Jun. 1998.

D. Cong and M. Hamlen, and C. Perkins, RFC 2006, "The Definitions of Managed Objects for IP Mobility Support using SMIv2," Motorola and IBM, Oct. 1996.

D. Carrel and Lol Grant, Internet Draft, "The TACACS+ Protocol," Jan. 1997.

C. Rigney, et al., RFC 2138, "Remote Authentication Dial in User Service (RADIUS)," Apr. 1997.

J. Kohl, et al., RFC 1510, "The Kerberos Network Authentication Service (V5)" Sep. 1993.

C. Perkins, Ed., RFC 3220, "IP Mobility Support for IPv4" Jan. 2002.

C. Finseth, RFC 1492, "An Access Control Protocol, Sometimes Called TACACS," Jul. 1993.

C. Perkins, et al., Internet Draft, "AAA Registration Keys for Mobile IP," http://www.ietf.org/proceedings/00jul/I-D/mobileip-aaa-key-01.txt, Jan. 28, 2000.

C. Perkins, Ed. RFC 3344, "IP Mobility Support for IPv4," Aug. 2002.

G. Zorn, RFC 2759, "Microsoft PPP CHAP Extensions, Version 2," Jan. 2000.

G. Dommety, et al. RFC 3115, "Mobile IP Vendor/Organization-Specific Extensions," Apr. 2001.

G. Zorn, RFC 2548, "Microsoft Vendor-specific RADIUS Attributes," Mar. 1999.

C. Perkins, et al., RFC 3012, "Mobile IPv4 Challenge/Response Extensions," Nov. 2000.

C. Perkins, et al., Internet Draft, "AAA Registration Keys for Mobile IP," draft-ietf-mobileip-aaa-key-13.txt, Jun. 22, 2003.

C. Perkins, et al., Internet Draft, "AAA Registration Keys for Mobile IP," draft-ietf-mobileip-aaa-key-10.txt, Oct. 23, 2002.

S. Jacobs, et al., Internet Draft, "Mobile IP Public Key Based Authentication," draft-jacobs-mobilcip-pki-auth-03.txt, Jul. 9, 2001.

K. Leung, et al., U.S. Appl. No. 10/328,522, "Methods and Apparatus for Authenticating Mobility Entities Using Kerberos," filed Dec. 24, 2002.

G. Dommety, et al. U.S. Appl. No. 10/992,435, "Infrastructure-less Bootstrapping: Trustless Bootstrapping to Enable Mobility for Mobile Devices," filed Nov. 17, 2004.

C. Perkins, *Mobile IP and Security Issue: An Overview*, Nokia, U.S., Oct. 25, 1999, pp. 131-148, XP010514313.

K. Sufatrio, et al., *Mobile IP Registration Protocol: A Security Attack and New Secure Minimal Public-Key Based Authentication*, Parallel Architectures, Algorithms, and Networks, 1999 (I-Span '99) proceedings. Fourth International Symposium, Perth/Fremantle, Australia, Jun. 23-25, 1999, Los Alamitos, California, IEEE pp. 364-369, XP010341845.

S. Jacobs, *Security of Current Mobile IP Solutions*, MILCOM 97 Proceedings, Monterey, California, Nov. 2-5, 1997, IEEE pp. 1122-1128, XP010260752.

S. Jacobs, *Mobile IP Public Key Based Authentication*, internet draft, Aug. 1, 1998, pp. 1-27, XP002285008.

A. Patel, et al., U.S. Appl. No. 10/635,882 Methods and Apparatus for Dynamic Session Key Generation and Rekeying in Mobile IP, Filed Feb. 3, 2005; Pub. 2005/0025091.

Haverinen et al., "Extensible Authentication Protocol Method for GSM Subscriber Identity Modules (EAPSIM), "INTERNET DRAFT, Dec. 21, 2004.

Rigney et al., "Remote Authentication Dial in User Service (RADIUS)", RFC 2865, Jun. 2000 (76 pages).

Aboba et al., "The Network Access Identifier", RFC 2486, Jan. 1999.

Calhoun et al., "Mobile IP Network Access Identifier Extension for IPv4", RFC 2794, Mar. 2000.

D. Eastlake "DNS Security Operational Considerations", RFC 2541, Mar. 1999.

Johnson et al., "Mobility Support in IPv6", RFC 3775, Jun. 2004.

US Office Action dated Jul. 26, 2006 from U.S. Appl. No. 10/328,522.

US Office Action dated Jan. 11, 2007 from U.S. Appl. No. 10/328,522.

U.S. Office Action mailed Jul. 3, 2007 from U.S. Appl. No. 10/328,522, 16 pgs.

U.S. Office Action dated Dec. 21, 2007 from related U.S. Appl. No. 10/328,522, 15 pages.

U.S. Office Action dated Mar. 13, 2007 from related U.S. Appl. No. 10/635,882.

U.S. Office Action dated Aug. 20, 2007 from related U.S. Appl. No. 10/635,882.

U.S. Office Action dated Feb. 5, 2008 from related U.S. Appl. No. 10/635,882.

U.S. Office Action dated Mar. 17, 2008 from related U.S. Appl. No. 10/992,435, 15 pages.

U.S. Office Action dated Mar. 3, 2008 from related U.S. Appl. No. 11/258,720, 14 pages.

International Search Report dated Jun. 18, 2004 from the related International Application No. PCT/US 03/36850.

International Search Report and Written Opinion dated May 21, 2007, from corresponding International Application No. PCT/US06/41511.

EP Office Action dated Sep. 6, 2006, from EP Patent No. 03789813.7.

\* cited by examiner

METHODS AND APPARATUS FOR BOOTSTRAPPING MOBILE-FOREIGN AND FOREIGN-HOME AUTHENTICATION KEYS IN MOBILE IP

RELATED APPLICATIONS

This application claims priority from and is a continuation of U.S. patent application Ser. No. 10/951,499, entitled "METHODS AND APPARATUS FOR BOOTSTRAPPING MOBILE-FOREIGN AND FOREIGN-HOME AUTHENTICATION KEYS IN MOBILE IP," by Gundavelli et al, filed on Sep. 27, 2004, which is incorporated herein by reference for all purposes.

BACKGROUND OF THE INVENTION

The present invention relates to Mobile IP network technology. More specifically, this invention relates to mechanisms for generating Mobile-Foreign and Foreign-Home authentication keys.

Mobile IP is a protocol which allows laptop computers or other mobile computer units (referred to as "Mobile Nodes" herein) to roam between various sub-networks at various locations—while maintaining internet and/or WAN connectivity. Without Mobile IP or a related protocol, a Mobile Node would be unable to stay connected while roaming through various sub-networks. This is because the IP address required for any node to communicate over the internet is location specific. Each IP address has a field that specifies the particular sub-network on which the node resides. If a user desires to take a computer which is normally attached to one node and roam with it so that it passes through different sub-networks, it cannot use its home base IP address. As a result, a business person traveling across the country cannot merely roam with his or her computer across geographically disparate network segments or wireless nodes while remaining connected over the internet. This is not an acceptable state-of-affairs in the age of portable computational devices.

To address this problem, the Mobile IP protocol has been developed and implemented. An implementation of Mobile IP is described in RFC 3344 of the Network Working Group, C. Perkins, Ed., "IP Mobility Support for IPv4," August 2002. Mobile IP is also described in the text "Mobile IP Unplugged" by J. Solomon, Prentice Hall. Both of these references are incorporated herein by reference in their entireties and for all purposes.

The Mobile IP process in a Mobile IPv4 environment are illustrated in FIG. 1. As shown there, a Mobile IP environment 2 includes the internet (or a WAN) 4 over which a Mobile Node 6 can communicate remotely via mediation by a Home Agent 8 and may also include a Foreign Agent 10. In the absence of a Foreign Agent, the Mobile Node 6 can obtain a topologically correct IP address (i.e., collocated IP address) and register this IP address with the Home Agent. Typically, the Home Agent and Foreign Agent are routers or other network connection devices performing appropriate Mobile IP functions as implemented by software, hardware, and/or firmware. A particular Mobile Node (e.g., a laptop computer) plugged into its home network segment connects with the internet through its designated Home Agent. When the Mobile Node roams, it communicates via the internet through an available Foreign Agent. Presumably, there are many Foreign Agents available at geographically disparate locations to allow wide spread internet connection via the Mobile IP protocol. Note that it is also possible for the Mobile Node to register directly with its Home Agent.

As shown in FIG. 1, Mobile Node 6 normally resides on (or is "based at") a network segment 12 which allows its network entities to communicate over the internet 4 through Home Agent 8 (an appropriately configured router denoted R2). Note that Home Agent 8 need not directly connect to the internet. For example, as shown in FIG. 1, it may be connected through another router (a router R1 in this case). Router R1 may, in turn, connect one or more other routers (e.g., a router R3) with the internet.

Now, suppose that Mobile Node 6 is removed from its home base network segment 12 and roams to a remote network segment 14. Network segment 14 may include various other nodes such as a PC 16. The nodes on network segment 14 communicate with the internet through a router which doubles as Foreign Agent 10. Mobile Node 6 may identify Foreign Agent 10 through various solicitations and advertisements which form part of the Mobile IP protocol. When Mobile Node 6 engages with network segment 14, Foreign Agent 10 relays a registration request to Home Agent 8 (as indicated by the dotted line "Registration"). The Home and Foreign Agents may then negotiate the conditions of the Mobile Node's attachment to Foreign Agent 10. For example, the attachment may be limited to a period of time, such as two hours. When the negotiation is successfully completed, Home Agent 8 updates an internal "mobility binding table" which specifies the care-of address (e.g., a collocated care-of address or the Foreign Agent's IP address) in association with the identity of Mobile Node 6. Further, the Foreign Agent 10 updates an internal "visitor table" which specifies the Mobile Node address, Home Agent address, etc. In effect, the Mobile Node's home base IP address (associated with segment 12) has been shifted to the Foreign Agent's IP address (associated with segment 14).

Now, suppose that Mobile Node 6 wishes to send a message to a Correspondent Node 18 from its new location. In Mobile IPv4, a message from the Mobile Node is then packetized and forwarded through Foreign Agent 10 over the internet 4 and to Correspondent Node 18 (as indicated by the dotted line "packet from MN") according to a standard internet protocol. If Correspondent Node 18 wishes to send a message to Mobile Node—whether in reply to a message from the Mobile Node or for any other reason—it addresses that message to the IP address of Mobile Node 6 on sub-network 12. The packets of that message are then forwarded over the internet 4 and to router R1 and ultimately to Home Agent 8 as indicated by the dotted line ("packet to MN(1)"). From its mobility binding table, Home Agent 8 recognizes that Mobile Node 6 is no longer attached to network segment 12. It then encapsulates the packets from Correspondent Node 18 (which are addressed to Mobile Node 6 on network segment 12) according to a Mobile IP protocol and forwards these encapsulated packets to a "care of" address for Mobile Node 6 as shown by the dotted line ("packet to MN(2)"). The care-of address may be, for example, the IP address of Foreign Agent 10. Foreign Agent 10 then strips the encapsulation and forwards the message to Mobile Node 6 on sub-network 14. The packet forwarding mechanism implemented by the Home and Foreign Agents is often referred to as "tunneling." In the absence of a Foreign Agent, packets are tunneled directly to the Mobile Node 6 collocated care-of address.

The Mobile IP protocol requires the configuration of security associations between three entities: the mobile node, the Home Agent, and the Foreign Agent. The security-association defines an authentication key and an algorithm to be applied during the authentication process. Specifically, the authentication keys that need to be configured are the Mobile-Home authentication key on the mobile node and the Home Agent, the Foreign-Home authentication key on the Foreign Agent and the Home Agent, and the Mobile-Foreign authentication key on the mobile node and the Foreign Agent. These keys are typically statically configured on the Home Agent, Foreign Agent, and mobile node.

In enterprise deployments, configuration of the authentication keys among the large number of entities is a challenging, complex and tedious administrative task. patent application Ser. No. 10/635,882, entitled "METHODS AND APPARATUS FOR DYNAMIC SESSION KEY GENERATION AND REKEYING," by Patel et al and patent application Ser. No. 10/328,522, entitled "METHODS AND APPARATUS FOR AUTHENTICATING MOBILITY ENTITIES USING KERBEROS," by Leung et al each discloses a mechanism for dynamically generating Mobile-Home authentication keys on both the Home Agent and the mobile node. However, there fails to be a mechanism for dynamically generating the Foreign-Home and Mobile-Foreign authentication keys that does not require an infrastructure such as a Kerberos server or a Lightweight Directory Access Protocol (LDAP) server.

In view of the above, it would be beneficial if a mechanism for dynamically generating Foreign-Home and Mobile-Foreign authentication keys could be established.

SUMMARY OF THE INVENTION

The present invention enables Mobile-Foreign and Foreign-Home authentication keys to be dynamically generated in a Mobile IP environment. This is accomplished, in part, by utilizing the trust established between the Mobile Node and the Home Agent and/or a AAA server. The AAA represents authentication, authorization, and accounting. In this manner, the established trust may be extended to the Foreign Agent.

Various protocols such as the Remote Authentication Dial In User Service (RADIUS) and TACACS+ may be implemented to implement a AAA server. Note that the Home Agent or Foreign Agent providing accounting information to the server must provide communications in formats required by the AAA server protocol. RFC 2138 describes the RADIUS Protocol and is hereby incorporated by reference. Similarly, RFC 1492 describes TACACS and the Internet-Draft "The TACACS+ Protocol Version 1.78," available at http://www.ietf.org/internet-drafts/draft-grant-tacacs-02.txt, describes TACACS+. Both of these documents are incorporated herein by reference for all purposes.

In accordance with one aspect of the invention, the Mobile-Foreign and Foreign-Home authentication key are derived using a Diffie-Hellman key exchange scheme. The Diffie-Hellman key exchange scheme may be described with reference to two different entities, A and B. A chooses a random integer x. A computes the value: $X=(g^x)$ mod n. A then sends the value of X to B. Similarly, B chooses a random integer y. B computes the value: $Y=(g^y)$ mod n. B sends the value of Y to A. The Diffie-Hellman group parameters 'g' and 'n' are universally known to all the entities (Mobile Node, Foreign Agent, Home Agent). A may then compute the value $k=(Y^x)$ mod n, which is equal to (g power$^{xy}$) mod n. Similarly, B may then compute the value $k=(X^y)$ mod k, which is also equal to (g power$^{xy}$) mod n. In this manner, both A and B derive the same secret key. An intruder who is monitoring this key exchange would not be able to derive the same key as both A and B.

In accordance with another aspect of the invention, the authentication previously performed between the Mobile Node and the Home Agent is leveraged to ensure secure operation of the disclosed dynamic key generation scheme. Specifically, a Mobile-Home authentication key shared between a Mobile Node and a Home Agent is obtained. Both the Mobile Node and a Foreign Agent independently derive a Mobile-Foreign authentication key shared between the Mobile Node and a Foreign Agent. Similarly, both the Foreign Agent and the Home Agent independently derive a Foreign-Home authentication key shared between the Foreign Agent and the Home Agent. The derivation of the Mobile-Home authentication key and the Foreign-Home authentication key, as well as the associated key exchange messages, are performed using the Mobile-Home authentication key shared between the Mobile Node and the Home Agent. For instance, the values Y and X that are transmitted between the entities may be protected by a Mobile-Home Authentication Extension (MHAE) generated using a Mobile-Home authentication key shared between the Mobile Node and the Home Agent.

In accordance with yet another aspect of the invention, a method of generating an authentication key to be shared between the Mobile Node and a Foreign Agent to which the Mobile Node has roamed is performed in a Mobile Node supporting Mobile IP. Specifically, the Mobile Node generates a first key material and transmits the first key material to the Foreign Agent to enable the Foreign Agent to generate a Mobile-Foreign authentication key shared between the Mobile Node and the Foreign Agent. In addition, the Mobile Node receives a second key material from the Foreign Agent. The Mobile Node then generates the Mobile-Foreign authentication key shared between the Mobile Node and the Foreign Agent from the second key material.

In accordance with one embodiment, the Mobile Node generates the first key material via the Diffie-Hellman key exchange scheme. Specifically, the first key material (X) is generated and defined by the value of $X=(g^x)$ mod n, wherein x is a random integer, X is the first key material, and both g and n are group parameters that are universally known to the Mobile Node, Foreign Agent, and Home Agent.

In accordance with one embodiment, the Mobile Node generates the Mobile-Foreign authentication key shared between the Mobile Node and the Foreign Agent via the Diffie-Hellman key exchange scheme. Specifically, the Mobile Node computes the value $k=(Y^x)$ mod n, where Y is the second key material received from the Foreign Agent and k is the Mobile-Foreign authentication key.

In accordance with yet another aspect of the invention, a method of generating a Foreign-Home authentication key to be shared between a Foreign Agent and a Home Agent is performed by the Foreign Agent. Specifically, the Foreign Agent generates a second key material to be used by the Home Agent to generate a Foreign-Home authentication key shared between the Home Agent and the Foreign Agent. The Foreign Agent also transmits the second key material such that it is received by the Home Agent, thereby enabling the Home Agent to generate a Foreign-Home authentication key shared between the Home Agent and the Foreign Agent from the second key material. For instance, the second key material may be transmitted in a registration request. In addition, the Foreign Agent receives a first key material generated by the Home Agent to be used by the Foreign Agent to generate a Foreign-Home authentication key shared between the Foreign Agent and the Home Agent. For instance, the first key material may be transmitted in a registration reply. The Foreign Agent further generates the Foreign-Home authentication key shared between the Home Agent and the Foreign Agent from the first key material after it receives the first key material from the Home Agent.

In accordance with one embodiment, the Foreign Agent determines whether the Foreign Agent shares an authentication key with the Home Agent. Only when the Foreign Agent does not share an authentication key with the Home Agent does the Foreign Agent transmit a request for a Foreign-Home authentication key. When the Foreign Agent receives key material generated by the Home Agent (e.g., either directly from the Home Agent or indirectly), the Foreign Agent generates a Foreign-Home authentication key from the key material generated by the Home Agent.

In accordance with one embodiment, the Foreign Agent generates the second key material (Y) via the Diffie-Hellman key exchange scheme. Specifically, the Foreign Agent generates the second key material (Y) by computing the value of $Y=(g^y) \mod n$, where y is a random integer, Y is the second key material, and both g and n are group parameters that are universally known to the Mobile Node, Foreign Agent, and Home Agent.

In accordance with one embodiment, the Foreign Agent generates the Foreign-Home authentication key shared between the Home Agent and the Foreign Agent via the Diffie-Hellman key exchange scheme. Specifically, the Foreign Agent generates the Foreign-Home authentication key by computing the value $k=(X^y) \mod n$, where X is the first key material received from the Home Agent and k is the Foreign-Home authentication key.

In accordance with yet another aspect of the invention, a Foreign Agent generates an authentication key to be shared between a Mobile Node and the Foreign Agent to which the Mobile Node has roamed. Specifically, the Foreign Agent receives a first key material generated by the Mobile Node, thereby enabling the Foreign Agent to generate a Mobile-Foreign authentication key shared between the Mobile Node and the Foreign Agent. In addition, the Foreign Agent generates a second key material. The Foreign Agent then transmits the second key material to the Mobile Node, thereby enabling the Mobile Node to generate a Mobile-Foreign authentication key shared between the Mobile Node and the Foreign Agent. Moreover, the Foreign Agent generates the Mobile-Foreign authentication key shared between the Mobile Node and the Foreign Agent from the first key material.

In accordance with one embodiment, the Foreign Agent generates the second key material via the Diffie-Hellman key exchange scheme. Specifically, the Foreign Agent generates the second key material by computing the value of $Y=(g^y) \mod n$, where y is a random integer, Y is the second key material, and both g and n are group parameters that are universally known to the Mobile Node, Foreign Agent, and Home Agent.

In accordance with one embodiment, the Foreign Agent generates the Mobile-Foreign authentication key shared between the Mobile Node and the Foreign Agent via the Diffie-Hellman key exchange scheme by computing the value $k=(X^y) \mod n$, where X is the first key material received from the Mobile Node and where k is the Mobile-Foreign authentication key.

In accordance with yet another aspect of the invention, a Foreign Agent generates a Mobile-Foreign authentication key to be shared between a Mobile Node and the Foreign Agent. Specifically, the Foreign Agent receives a first registration request from the Mobile Node, the first registration request having a Mobile-Foreign key request extension including key material generated by the Mobile Node and indicating a request to generate a key between the Mobile Node and the Foreign Agent. The Foreign Agent determines whether it shares an authentication key with the Home Agent. When the Foreign Agent determines that it does not share an authentication key with the Home Agent, it generates key material and a Foreign-Home key request extension including the key material generated by the Foreign Agent. In addition, the Foreign-Home key request extension also indicates a request for the Home Agent to generate a key between the Foreign Agent and the Home Agent. The Foreign Agent then composes a first registration reply including the Foreign-Home key request extension, and sends the first registration reply to the Mobile Node. When it is determined that the Foreign Agent shares an authentication key with the Home Agent, it simply forwards the first registration request to the Home Agent.

In accordance with yet another aspect of the invention, a Foreign Agent generates both a Mobile-Foreign authentication key to be shared between a Mobile Node and a Foreign Agent and a Foreign-Home authentication key to be shared between the Foreign Agent and a Home Agent. The Foreign Agent receives a first key material generated by the Mobile Node, thereby enabling the Foreign Agent to generate a Mobile-Foreign authentication key shared between the Mobile Node and the Foreign Agent. The Foreign Agent generates a second key material, which it transmits to the Mobile Node, thereby enabling the Mobile Node to generate a Mobile-Foreign authentication key shared between the Mobile Node and the Foreign Agent. In this manner, the Foreign Agent and Mobile Node exchange the first and second key material for use in generation of the Mobile-Foreign authentication key. The Foreign Agent generates the Mobile-Foreign authentication key shared between the Mobile Node and the Foreign Agent from the first key material. The Foreign Agent also receives a third key material generated by the Home Agent to enable the Foreign Agent to generate a Foreign-Home authentication key shared between the Home Agent and the Foreign Agent. The Foreign Agent generates a fourth key material, which it transmits to the Home Agent. The fourth key material is generated to enable the Home Agent to generate a Foreign-Home authentication key shared between the Home Agent and the Foreign Agent. In this manner, the third and fourth key material are exchanged between the Foreign Agent and the Home Agent for use in generation of the Foreign-Home authentication key by both the Foreign Agent and the Home Agent. In addition, the Foreign Agent generates the Foreign-Home authentication key shared between the Home Agent and the Foreign Agent from the third key material.

In accordance with one embodiment, the Foreign Agent generates both the Mobile-Foreign authentication key and the Foreign-Home authentication key using the Diffie-Hellman Key Exchange scheme.

In accordance with yet another aspect of the invention, a Home Agent supporting Mobile IP performs registration of a Mobile Node visiting a Foreign Agent. The Home Agent receives a registration request including a Foreign-Home key request extension, the Foreign-Home key request extension including key material generated by the Foreign Agent and indicating a request for the Home Agent to generate a key between the Foreign Agent and the Home Agent. The Home Agent composes a registration reply including a Foreign-Home key reply extension including key material generated by the Home Agent. The Home Agent sends the registration reply to the Foreign Agent, the registration reply indicating success or failure of the registration of the Mobile Node with the Home Agent.

In accordance with one embodiment, both the key material in the Foreign-Home key request extension and the key material in the Foreign-Home key reply extension are generated according to the Diffie-Hellman key exchange scheme. For instance, the Home Agent may generate the key material to be provided in the Foreign-Home key reply extension by computing the value of $X=(g^x) \mod n$, wherein x is a random integer, X is the key material generated by the Home Agent, and both g and n are group parameters that are universally known to the Mobile Node, Foreign Agent, and Home Agent.

In accordance with one embodiment, the Home Agent generates a Foreign-Home authentication key from the key material obtained from the Foreign-Home key request extension. For instance, the Foreign-Home authentication key may be generated according to the Diffie-Hellman key exchange scheme. Specifically, the Home Agent may generate the Foreign-Home authentication key shared between the Foreign Agent and the Home Agent from the key material obtained from the Foreign-Home key request extension by computing the value $k=(Y^x) \mod n$, where Y is the key material obtained from the Foreign-Home key request extension and k is the Foreign-Home authentication key.

In accordance with one embodiment, the order in which the key material exchange and key generation is performed by the Mobile Node, Foreign Agent, and Home Agent is defined in various embodiments of the invention. Specifically, the trust between the Mobile Node and the Home Agent is leveraged to generate and authenticate the Mobile-Foreign and Foreign-Home authentication keys. This is accomplished by coupling the key message exchanges with the Mobile IP message flow, as will be described in further detail below with reference to FIGS. 2A and 2B.

In accordance with another aspect of the invention, the invention pertains to a system operable to perform and/or initiate the generation of the Mobile-Foreign key and/or Foreign-Home authentication key. The system includes one or more processors and one or more memories. At least one of the memories and processors are adapted to provide at least some of the above described method operations. In yet a further embodiment, the invention pertains to a computer program product for performing the disclosed methods. The computer program product has at least one computer readable medium and computer program instructions stored within at least one of the computer readable product configured to perform at least some of the above described method operations.

These and other features and advantages of the present invention will be presented in more detail in the following specification of the invention and the accompanying figures, which illustrate by way of example the principles of the invention.

DETAILED DESCRIPTION OF SPECIFIC EMBODIMENTS

Reference will now be made in detail to a specific embodiment of the invention. An example of this embodiment is illustrated in the accompanying drawings. While the invention will be described in conjunction with this specific embodiment, it will be understood that it is not intended to limit the invention to one embodiment. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

The disclosed embodiments enable key material to be transmitted securely among the Mobile Node, Home Agent, and Foreign Agent. In accordance with one embodiment, the key material and authentication keys generated from the key material are created in accordance with the Diffie-Hellman key exchange scheme. The key material may be transmitted among the Mobile Node, Home Agent, and Foreign Agent in packets such as registration request and/or registration reply packets. This may be accomplished via an extension to the registration request and/or registration reply packets. These extensions may be referred to as key request or key reply extensions.

Once an authentication key has been generated, the authentication key may be identified by a Security Parameter Index (SPI). The Security Parameter Index is an identifier that specifies a security association, or "row" in a security-association table, that a receiver should use to interpret a received packet. The security-association defines an authentication key and the algorithm to be applied during the authentication process. The use of a security association to authenticate a packet is described in further detail in U.S. patent application Ser. No. 09/227,399, entitled "Mobile IP Authentication", by K. Leung, which is incorporated herein by reference for all purposes.

Figure 1:
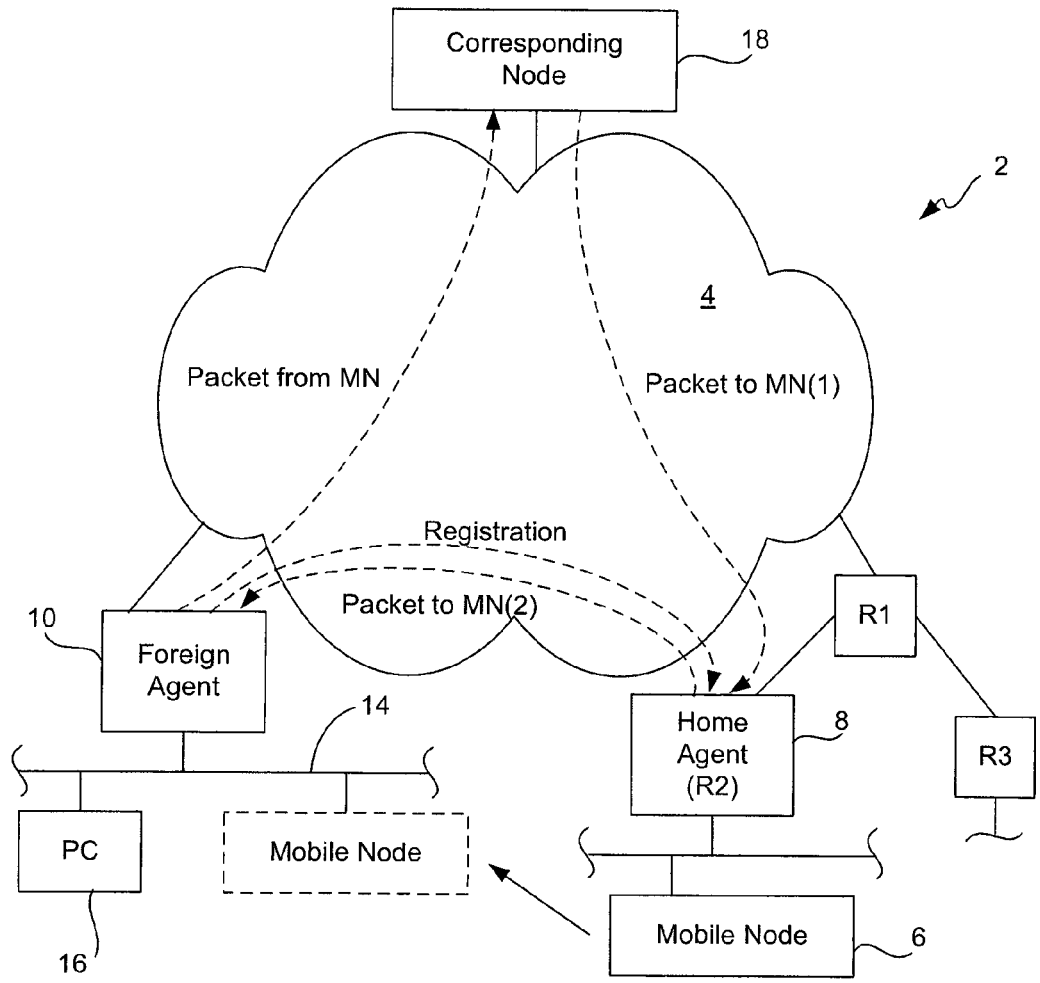
FIG. 1 is a diagram of a Mobile IP network segment and associated environment.
Figure 2A:
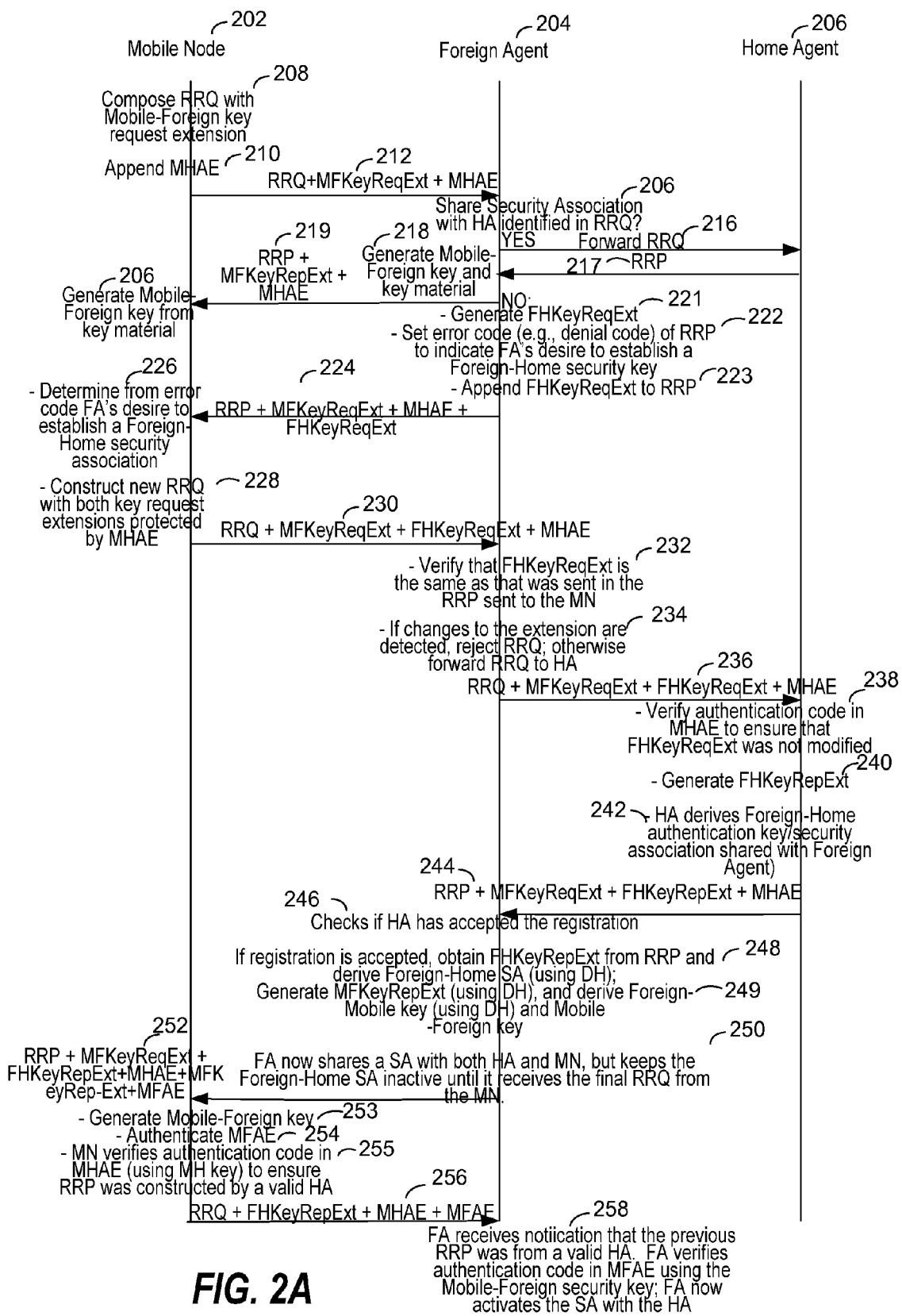
FIG. 2A is a transaction flow diagram illustrating a message flow supporting dynamic generation of Mobile-Foreign and Foreign-Home authentication keys in accordance with a first embodiment of the invention in which two subsequent registration request messages are transmitted by the Mobile Node.

FIG. 2A is a transaction flow diagram illustrating a message flow supporting dynamic generation of Mobile-Foreign and Foreign-Home authentication keys in accordance with a first embodiment of the invention. Steps performed by the Mobile Node, Foreign Agent, and Home Agent are represented by vertical lines 202, 204, and 206, respectively. The Mobile Node composes a registration request (RRQ) and appends a Mobile-Foreign key request extension (MFKey-ReqExt) generated by the Mobile Node to the registration request at 208. The Mobile-Foreign key request extension includes key material generated by the Mobile Node and indicates a request to generate a key between the Mobile Node and the Foreign Agent. An exemplary key request extension will be described in further detail below with reference to FIG. 3.

In accordance with one embodiment, the Mobile Node generates the first key material via the Diffie-Hellman key exchange scheme. Specifically, the value of $X=(g^x) \mod n$, wherein x is a random integer, X is the first key material, and both g and n are group parameters that are universally known to the Mobile Node, Foreign Agent, and Home Agent.

In order to ensure secure operation of the disclosed key generation scheme, the trust between the Mobile Node and the Home Agent is leveraged. Specifically, a Mobile-Home Authentication Extension (MHAE) is appended to the registration request at 210. The MHAE is generated according to standard processes using the Mobile-Home authentication key shared between the Mobile Node and the Home Agent. The authentication key shared between the Mobile Node and the Home Agent may be statically configured or dynamically generated according to a variety of processes. One such process for dynamically generating the Mobile-Home authentication key is disclosed in patent application Ser. No. 10/635,882, entitled "METHODS AND APPARATUS FOR DYNAMIC SESSION KEY GENERATION AND REKEYING," by Patel et al and patent application Ser. No. 10/328,522, entitled "METHODS AND APPARATUS FOR AUTHENTICATING MOBILITY ENTITIES USING KERBEROS," by Leung et al.

The registration request with the Mobile-Foreign key request extension and MHAE is transmitted to the Foreign Agent at 212. In accordance with one embodiment, when the Foreign Agent receives the registration request, it determines whether it shares an authentication key (or security association) with the Home Agent identified in the registration request at 214.

If the Foreign Agent already shares an authentication key or security association with the Home Agent, it forwards the registration request to the Home Agent at 216, which processes the registration request according to standard processes. The Home Agent composes and sends a registration reply (RRP) at 217. In accordance with standard processes, the registration reply indicates success or failure of the registration of the Mobile Node with the Home Agent. The Foreign Agent generates key material (e.g., via the Diffie-Hellman key exchange scheme). Specifically, the Foreign Agent generates the key material by computing the value of $Y=(g^y)\bmod n$, where y is a random integer, Y is the key material, and both g and n are group parameters that are universally known to the Mobile Node, Foreign Agent, and Home Agent. In addition, the Foreign Agent may generate the Mobile-Foreign authentication key shared between the Mobile Node and the Foreign Agent (e.g., via the Diffie-Hellman key exchange scheme). Specifically, the Foreign Agent generates the Mobile-Foreign authentication key by computing the value $k=(X^y)\bmod n$, where X is the key material received from the Mobile Node and k is the Mobile-Foreign authentication key. The Foreign Agent then generates and appends a Mobile-Foreign key reply extension (MFKeyRepExt) including the key material generated by the Foreign Agent to the registration reply at 218 and transmits the registration reply at 219 to the Mobile Node. Specifically, the registration reply message is a registration reject message.

The Mobile Node, upon receiving the registration reply, obtains the key material generated by the Foreign Agent from the Mobile-Foreign key reply extension at 220 and generates the Mobile-Foreign authentication key. The Mobile Node generates the Mobile-Foreign authentication key shared between the Mobile Node and the Foreign Agent (e.g., via the Diffie-Hellman key exchange scheme). Specifically, the Mobile Node computes the value $k=(Y^x)\bmod n$, where Y is the key material received from the Foreign Agent and k is the Mobile-Foreign authentication key.

If the Foreign Agent does not share an authentication key or security association with the Home Agent, it generates a Foreign-Home key request extension (FHKeyReqExt) at 221 including key material generated by the Foreign Agent for purposes of the Foreign-Home key generation. The Foreign-Home key request extension indicates a request for the Home Agent to generate a Foreign-Home authentication key shared between the Foreign Agent and the Home Agent. An exemplary key request extension will be described in further detail below with reference to FIG. 3. In addition, the Foreign Agent may also set an error code (e.g., denial code) of the registration reply to indicate the Foreign Agent's desire to establish a Foreign-Home authentication key at 222. From this error code, the Mobile Node may be made aware of the presence of the Foreign-Home key request extension that is to be transmitted to the Home Agent. The Foreign Agent then appends the Foreign-Home key request extension to the registration reply at 223 and transmits the registration reply at 224. For instance, the Foreign Agent may append the Foreign-Home key request extension to the registration reply having the Mobile-Foreign key request extension and the MHAE.

When the Mobile Node receives the registration reply, it determines whether the Foreign Agent has requested generation of a Foreign-Home authentication key. In accordance with one embodiment, the Mobile Node determines from an error code of the registration reply that the Foreign Agent is requesting that a Foreign-Home authentication key to be shared between the Foreign Agent and the Home Agent be generated at 226. The Mobile Node then constructs a new, second registration request with both the Mobile-Foreign and Foreign-Home key request extensions at 228. In order to ensure secure operation of the disclosed key generation scheme, the Mobile Node appends the MHAE to the second registration request. The Mobile Node then transmits the second registration request to the Foreign Agent at 230.

When the Foreign Agent receives the second registration request, this second registration request should include the Foreign-Home key request extension previously generated by the Foreign Agent. Thus, the Foreign Agent may verify whether the Foreign-Home key request extension in this second registration request is the same as that provided by the Foreign Agent in the first registration reply at 232. If the Foreign-Home key request extension of the second registration request is not the same as that previously provided in the first registration reply by the Foreign Agent, the Foreign Agent rejects the second registration request at 234. Otherwise, the Foreign Agent forwards the second registration request to the Home Agent at 236.

When the Home Agent receives the second registration request, it verifies the MHAE (e.g., verifies the authentication code in the MHAE) to ensure that the Foreign-Home key request extension was not modified at 238. Once verification has been completed, the Home Agent generates a Foreign-Home key reply extension (FHKeyRepExt) at 240. The Foreign-Home key reply extension includes key material generated by the Home Agent that may be used to generate a Foreign-Home authentication key to be shared between the Foreign Agent and the Home Agent. For instance, the key material may be generated according to the Diffie-Hellman key exchange scheme. An exemplary key reply extension will be described in further detail below with reference to FIG. 3. Thus, the Home Agent generates the key material to be provided in the Foreign-Home key reply extension by computing the value of $X=(g^x)\bmod n$, wherein x is a random integer, X is the key material generated by the Home Agent, and both g and n are group parameters that are universally known to the Mobile Node, Foreign Agent, and Home Agent.

The Home Agent now has enough information to derive the Foreign-Home authentication key (and security association) shared with the Foreign Agent at 242. In accordance with one embodiment, the Home Agent generates a Foreign-Home authentication key from the key material obtained from the Foreign-Home key request extension. For instance, the Foreign-Home authentication key may be generated according to the Diffie-Hellman key exchange scheme. Specifically, the Home Agent may generate the Foreign-Home authentication key shared between the Foreign Agent and the Home Agent from the key material obtained from the Foreign-Home key request extension by computing the value $k=(Y^x)$ mod n, where Y is the key material obtained from the Foreign-Home key request extension and k is the Foreign-Home authentication key.

The Home Agent then composes and transmits a second registration reply to the Foreign Agent at 244. In accordance with standard Mobile IP processes, the second registration reply indicates success or failure of the registration of the Mobile Node with the Home Agent. This second registration reply includes the Foreign-Home key reply extension including the key material generated by the Home Agent. In addition, the second registration reply may also include the Mobile-Foreign key request extension. Thus, the second registration reply may include both the Mobile-Foreign key request extension and the Foreign-Home key reply extension. In order to ensure secure operation of the key generation scheme, the second registration reply may be protected with the MHAE.

When the Foreign Agent receives the second registration reply, it determines whether the second registration reply indicates that the Home Agent has accepted the registration of the Mobile Node with the Home Agent at 246. If the registration is successful, the Foreign Agent obtains the key material generated by the Home Agent from the second registration reply. Specifically, the Foreign Agent obtains the Foreign-Home key reply extension from the second registration reply and obtains the key material generated by the Home Agent from the Foreign-Home key reply extension, thereby enabling the Foreign Agent to generate the Foreign-Home authentication key. The Foreign Agent then generates the Foreign-Home authentication key from the key material generated by the Home Agent at 248. In addition, the Foreign Agent generates the Mobile-Foreign key reply extension.

In accordance with one embodiment, the Foreign Agent generates the Foreign-Home authentication key shared between the Home Agent and the Foreign Agent via the Diffie-Hellman key exchange scheme. Specifically, the Foreign Agent generates the Foreign-Home authentication key by computing the value $k=(X^y)$ mod n, where X is the key material received from and generated by the Home Agent and k is the Foreign-Home authentication key.

The Mobile-Foreign key reply extension includes key material generated by the Foreign Agent for purposes of generating the Mobile-Foreign authentication key shared between the Mobile Node and the Foreign Agent. In accordance with one embodiment, the Foreign Agent generates the key material via the Diffie-Hellman key exchange scheme. Specifically, the Foreign Agent generates the key material by computing the value of $Y=(g^y)$ mod n, where y is a random integer, Y is the key material generated by the Mobile Node, and both g and n are group parameters that are universally known to the Mobile Node, Foreign Agent, and Home Agent.

The Foreign Agent may also generate the Mobile-Foreign authentication key at this time. Specifically, the Foreign Agent may generate the Mobile-Foreign authentication key shared between the Mobile Node and the Foreign Agent via the Diffie-Hellman key exchange scheme. Specifically, the Foreign Agent generates the Mobile-Foreign authentication key by computing the value $k=(X^y)$ mod n, where X is the key material generated by and received from the Mobile Node and k is the Mobile-Foreign authentication key at 249.

The Foreign Agent now shares an authentication key with both the Mobile Node and the Home Agent, but may keep the Foreign-Home authentication key inactive until it receives the final acknowledgement that the second registration reply was constructed by a valid Home Agent at 250. For instance, the final acknowledgement may be sent in the form of a registration request from the Mobile Node.

The Foreign Agent then appends a Mobile-Foreign key reply extension including the key material generated by the Foreign Agent to the second registration reply. In addition, the Foreign Agent may secure the transmission by generating and appending a Mobile-Foreign Authentication Extension (MFAE) to the second registration reply using the Mobile-Foreign authentication key shared between the Mobile Node and the Foreign Agent. Thus, the second registration reply that is transmitted at 252 to the Mobile Node may include the Mobile-Foreign key request extension, Foreign-Home key reply extension, MHAE, Mobile-Foreign key reply extension and MFAE.

The Mobile Node may obtain the key material generated by the Foreign Agent from the Mobile-Foreign key reply extension, enabling the Mobile Node to generate the Mobile-Foreign authentication key at 253. In accordance with one embodiment, the Mobile Node generates the Mobile-Foreign authentication key shared between the Mobile Node and the Foreign Agent via the Diffie-Hellman key exchange scheme. Specifically, the Mobile Node computes the value $k=(Y^x)$ mod n, where Y is the key material received from the Foreign Agent (e.g., in the Mobile-Foreign key reply extension) and k is the Mobile-Foreign authentication key. The Mobile Node now shares an authentication key and therefore a security association with the Foreign Agent.

Once the Mobile Node has generated the Mobile-Foreign authentication key, it may verify that the second registration reply was transmitted by a valid Foreign Agent by authenticating the MFAE using the Mobile-Foreign authentication key at 254. In addition, the Mobile Node verifies that the second registration reply was constructed by a valid Home Agent by verifying the authentication code in the MHAE using the Mobile-Home authentication key at 255.

Once the Mobile Node has verified that the second registration reply was constructed by a valid Home Agent, it sends a message such as a registration request message to the Foreign Agent indicating that the second registration reply was constructed by a valid Home Agent. In accordance with one embodiment, this message is sent in the form of a new registration request message. For instance, the Mobile node may compose a registration request including the Foreign-Home key reply extension protected by both the MHAE and MFAE generated by the Mobile Node using the Mobile-Home authentication key and Mobile-Foreign authentication key recently generated, respectively. The Mobile Node then transmits this registration request at 256 to the Foreign Agent. If the Mobile Node cannot authenticate the second registration reply that it has received from the Foreign Agent, it drops the second registration reply and does not send any further messages. The Foreign Agent will thereafter delete the generated Mobile-Foreign and Mobile-Home authentication keys after a period of time.

As set forth above, a registration request message is transmitted by the Mobile Node to indicate that the second registration reply was constructed by a valid Home Agent. However, it is important to note that other message types may be used to indicate that the second registration reply was constructed by a valid Home Agent. Of course, in alternate embodiments, it is also possible to send a message indicating that the second registration reply was not constructed by a valid Home Agent.

When the Foreign Agent receives the acknowledgement message (e.g., registration request) from the Mobile Node at 258, it has now received notification that the previous second registration reply was constructed by a valid Home Agent. The Foreign Agent then validates the MFAE using the Mobile-Foreign authentication key to ensure that the acknowledgement message was received by a valid Mobile Node. In other words, when the Foreign Agent has successfully authenticated the MFAE, the MHAE was successfully authenticated by the Mobile Node. The Foreign Agent may then activate the Foreign-Home authentication key (or security association) after the acknowledgement message has been received from the Mobile Node. Alternatively, the Foreign Agent may generate the Foreign-Home authentication key at this time.

As described above, the acknowledgement message may be a registration request message. In accordance with one embodiment, the registration request message includes a Time To Live field having a value of 1. When the Foreign Agent determines that the Time To Live field has a value equal to 1, the Foreign Agent recognizes that the purpose of this third registration request is merely to indicate that the Foreign Agent is to generate or activate the Foreign-Home authentication key (and that the Mobile-Foreign key generation by the Mobile Node was successful). Thus, when the third registration request has a Time To Live field having a value of 1, the Foreign Agent drops the third registration request message without forwarding the third registration message to the Home Agent.

Figure 2B:
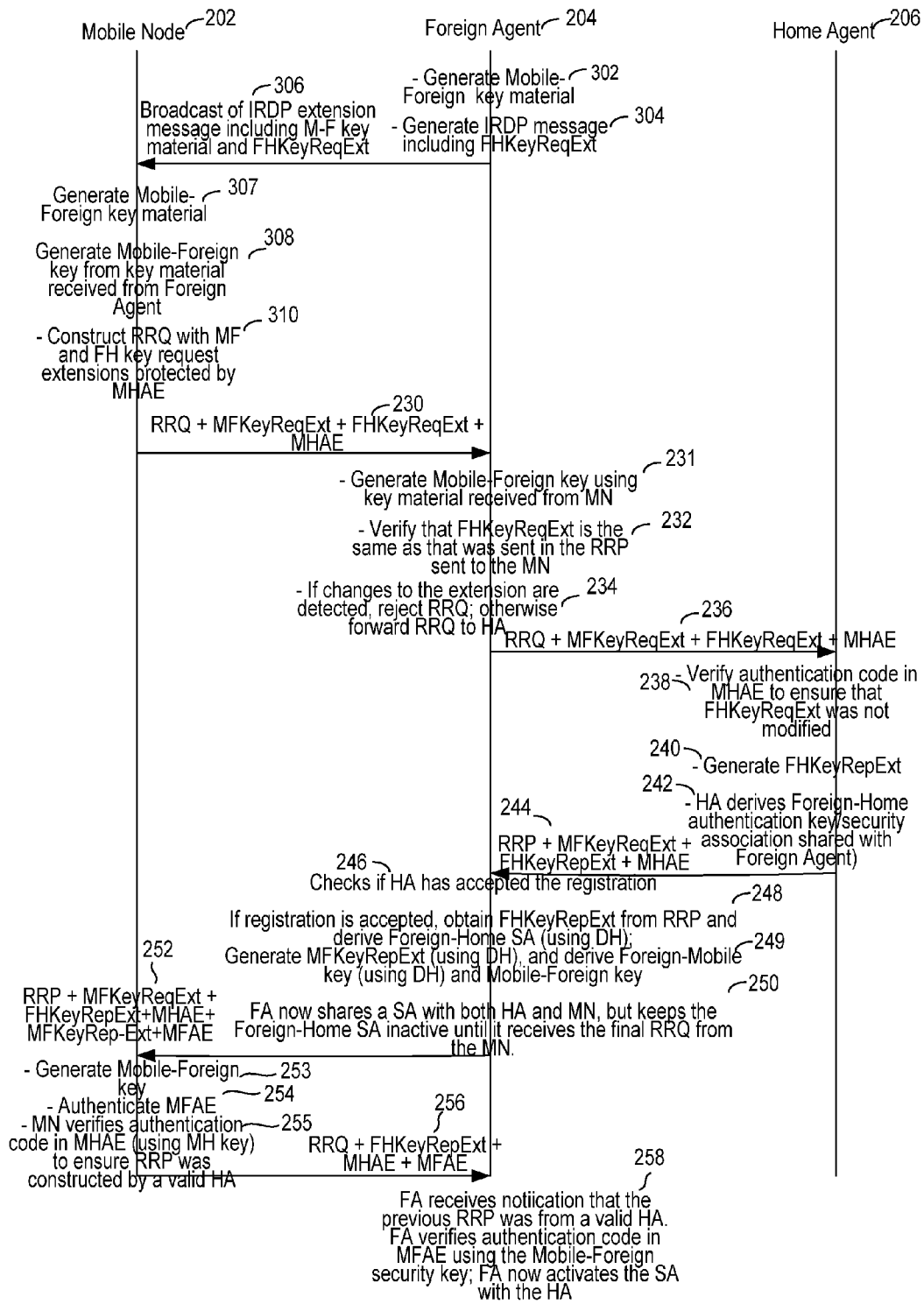
FIG. 2B is a transaction flow diagram illustrating a message flow supporting dynamic generation of Mobile-Foreign and Foreign-Home authentication keys in accordance with a second embodiment of the invention in which an IRDP message is transmitted by the Foreign Agent followed by a registration request transmitted by the Mobile Node.

FIG. 2B is a transaction flow diagram illustrating a message flow supporting dynamic generation of Mobile-Foreign and Foreign-Home authentication keys in accordance with a second embodiment of the invention in which an IRDP message is transmitted by the Foreign Agent followed by a registration request transmitted by the Mobile Node.

In an alternative embodiment, rather than transmitting the registration reply to the Mobile Node as shown at 223 of FIG. 2A, the Foreign Agent may periodically broadcast the Foreign-Home key request in an ICMP Router Discovery Protocol (IRDP) message, as set forth in RFC 1256, which is incorporated herein by reference for all purposes. The Mobile Node receiving an IRDP message with this extension can then construct a registration request with this extension and forward it to the foreign agent. When the Foreign Agent subsequently receives the registration request with this extension, it can subsequently forward it to the Home Agent.

In this embodiment, the first registration request and registration reply messages of the first embodiment are not implemented. As a result, the time it typically takes for a roundtrip between the Mobile Node and Foreign Agent is eliminated. Specifically, as shown at 302, the Foreign Agent generates the Mobile-Foreign authentication key shared between the Mobile Node and the Foreign Agent (e.g., via the Diffie-Hellman key exchange scheme). Specifically, the Foreign Agent generates the Mobile-Foreign authentication key by computing the value $k=(X^y) \mod n$, where X is the key material received from the Mobile Node and k is the Mobile-Foreign authentication key. The Foreign Agent then generates an IRDP advertisement message at 304.

If the Foreign Agent does not share an authentication key or security association with the Home Agent, it generates a Foreign-Home key request extension (FHKeyReqExt) including key material generated by the Foreign Agent for purposes of the Foreign-Home key generation. The Foreign-Home key request extension indicates a request for the Home Agent to generate a Foreign-Home authentication key shared between the Foreign Agent and the Home Agent. An exemplary key request extension will be described in further detail below with reference to FIG. 3. The Foreign Agent then appends the Foreign-Home key request extension (FHKeyReqExt) to the IRDP message. The Foreign Agent then broadcasts the IRDP message including the Mobile-Foreign key material and the FHKeyReqExt at 306.

The Mobile Node may, upon receiving the IRDP message from the Foreign Agent, generate its Mobile-Foreign key material at 307. In accordance with one embodiment, the Mobile Node generates the Mobile-Foreign key material via the Diffie-Hellman key exchange scheme. Specifically, the value of $X=(g^x) \mod n$, wherein x is a random integer, X is the first key material, and both g and n are group parameters that are universally known to the Mobile Node, Foreign Agent, and Home Agent.

The Mobile Node, upon receiving the IRDP message, obtains the key material generated by the Foreign Agent from an extension of the IRDP message at 308 and generates the Mobile-Foreign authentication key from the key material received from the Foreign Agent in the IRDP message. In accordance with one embodiment, the Mobile Node generates the Mobile-Foreign authentication key shared between the Mobile Node and the Foreign Agent via the Diffie-Hellman key exchange scheme. Specifically, the Mobile Node computes the value $k=(Y^x) \mod n$, where Y is the key material received from the Foreign Agent and k is the Mobile-Foreign authentication key.

When the Mobile Node receives the IRDP message, it determines whether the Foreign Agent has requested generation of a Foreign-Home authentication key. In accordance with one embodiment, the Mobile Node determines from the presence of the Foreign-Home key request extension of the IRDP message that the Foreign Agent is requesting that a Foreign-Home authentication key to be shared between the Foreign Agent and the Home Agent be generated. The Mobile Node then constructs a registration request with both a Mobile-Foreign key request extension including the key material generated by the Mobile Node at 307 and the Foreign-Home key request extension at 310. In order to ensure secure operation of the disclosed key generation scheme, the Mobile Node appends the MHAE to the registration request. The Mobile Node then transmits the registration request to the Foreign Agent at 230.

The Foreign Agent then generates the Mobile-Foreign key using the key material received from the Mobile Node in the Mobile-Foreign key request extension of the registration request at 231. In accordance with one embodiment, the Foreign Agent generates the Mobile-Foreign authentication key shared between the Mobile Node and the Foreign Agent via the Diffie-Hellman key exchange scheme. Specifically, the Foreign Agent generates the Mobile-Foreign authentication key by computing the value $k=(X^y) \mod n$, where X is the key material received from the Mobile Node and k is the Mobile-Foreign authentication key.

When the Foreign Agent receives the registration request, this registration request should include the Foreign-Home key request extension previously generated by the Foreign Agent. Thus, the Foreign Agent may verify whether the Foreign-Home key request extension in this registration request is the same as that provided by the Foreign Agent in the IRDP message at 232. If the Foreign-Home key request extension of the registration request is not the same as that previously provided in the IRDP message by the Foreign Agent, the Foreign Agent rejects the registration request at 234. Otherwise, the Foreign Agent forwards the registration request to the Home Agent at 236.

When the Home Agent receives the registration request, it verifies the MHAE (e.g., verifies the authentication code in the MHAE) to ensure that the Foreign-Home key request extension was not modified at 238. Once verification has been completed, the Home Agent generates a Foreign-Home key reply extension (FHKeyRepExt) at 240. The Foreign-Home key reply extension includes key material generated by the Home Agent that may be used to generate a Foreign-Home authentication key to be shared between the Foreign Agent and the Home Agent. For instance, the key material may be generated according to the Diffie-Hellman key exchange scheme. An exemplary key reply extension will be described in further detail below with reference to FIG. 3. Thus, the Home Agent generates the key material to be provided in the Foreign-Home key reply extension by computing the value of $X=(g^x)$ mod n, wherein x is a random integer, X is the key material generated by the Home Agent, and both g and n are group parameters that are universally known to the Mobile Node, Foreign Agent, and Home Agent.

The Home Agent now has enough information to derive the Foreign-Home authentication key (and security association) shared with the Foreign Agent at 242. In accordance with one embodiment, the Home Agent generates a Foreign-Home authentication key from the key material obtained from the Foreign-Home key request extension. For instance, the Foreign-Home authentication key may be generated according to the Diffie-Hellman key exchange scheme. Specifically, the Home Agent may generate the Foreign-Home authentication key shared between the Foreign Agent and the Home Agent from the key material obtained from the Foreign-Home key request extension by computing the value $k=(Y^x)$ mod n, where Y is the key material obtained from the Foreign-Home key request extension and k is the Foreign-Home authentication key.

The Home Agent then composes and transmits a registration reply to the Foreign Agent at 244. In accordance with standard Mobile IP processes, the registration reply indicates success or failure of the registration of the Mobile Node with the Home Agent. This registration reply includes the Foreign-Home key reply extension including the key material generated by the Home Agent. In addition, the registration reply may also include the Mobile-Foreign key request extension. Thus, the registration reply may include both the Mobile-Foreign key request extension and the Foreign-Home key reply extension. In order to ensure secure operation of the key generation scheme, the registration reply may be protected with the MHAE.

When the Foreign Agent receives the registration reply, it determines whether the registration reply indicates that the Home Agent has accepted the registration of the Mobile Node with the Home Agent at 246. If the registration is successful, the Foreign Agent obtains the key material generated by the Home Agent from the registration reply. Specifically, the Foreign Agent obtains the Foreign-Home key reply extension from the registration reply and obtains the key material generated by the Home Agent from the Foreign-Home key reply extension, thereby enabling the Foreign Agent to generate the Foreign-Home authentication key. The Foreign Agent then generates the Foreign-Home authentication key from the key material generated by the Home Agent at 248. In addition, the Foreign Agent generates the Mobile-Foreign key reply extension.

In accordance with one embodiment, the Foreign Agent generates the Foreign-Home authentication key shared between the Home Agent and the Foreign Agent via the Diffie-Hellman key exchange scheme. Specifically, the Foreign Agent generates the Foreign-Home authentication key by computing the value $k=(X^y)$ mod n, where X is the key material received from and generated by the Home Agent and k is the Foreign-Home authentication key.

The Mobile-Foreign key reply extension includes key material generated by the Foreign Agent for purposes of generating the Mobile-Foreign authentication key shared between the Mobile Node and the Foreign Agent. In accordance with one embodiment, the Foreign Agent generates the key material via the Diffie-Hellman key exchange scheme. Specifically, the Foreign Agent generates the key material by computing the value of $Y=(g^y)$ mod n, where y is a random integer, Y is the key material generated by the Mobile Node, and both g and n are group parameters that are universally known to the Mobile Node, Foreign Agent, and Home Agent.

The Foreign Agent may also generate the Mobile-Foreign authentication key at this time. Specifically, the Foreign Agent may generate the Mobile-Foreign authentication key shared between the Mobile Node and the Foreign Agent via the Diffie-Hellman key exchange scheme. Specifically, the Foreign Agent generates the Mobile-Foreign authentication key by computing the value $k=(X^y)$ mod n, where X is the key material generated by and received from the Mobile Node and k is the Mobile-Foreign authentication key at 249.

The Foreign Agent now shares an authentication key with both the Mobile Node and the Home Agent, but may keep the Foreign-Home authentication key inactive until it receives the final acknowledgement that the registration reply was constructed by a valid Home Agent at 250. For instance, the final acknowledgement may be sent in the form of a registration request from the Mobile Node.

The Foreign Agent then appends a Mobile-Foreign key reply extension including the key material generated by the Foreign Agent to the registration reply. In addition, the Foreign Agent may secure the transmission by generating and appending a Mobile-Foreign Authentication Extension (MFAE) to the registration reply using the Mobile-Foreign authentication key shared between the Mobile Node and the Foreign Agent. Thus, the registration reply that is transmitted at 252 to the Mobile Node may include the Mobile-Foreign key request extension, Foreign-Home key reply extension, MHAE, Mobile-Foreign key reply extension and MFAE.

The Mobile Node may obtain the key material generated by the Foreign Agent from the Mobile-Foreign key reply extension, enabling the Mobile Node to generate the Mobile-Foreign authentication key at 253. In accordance with one embodiment, the Mobile Node generates the Mobile-Foreign authentication key shared between the Mobile Node and the Foreign Agent via the Diffie-Hellman key exchange scheme. Specifically, the Mobile Node computes the value $k=(Y^x)$ mod n, where Y is the key material received from the Foreign Agent (e.g., in the Mobile-Foreign key reply extension) and k is the Mobile-Foreign authentication key. The Mobile Node now shares an authentication key and therefore a security association with the Foreign Agent.

Once the Mobile Node has generated the Mobile-Foreign authentication key, it may verify that the registration reply was transmitted by a valid Foreign Agent by authenticating the MFAE using the Mobile-Foreign authentication key at 254. In addition, the Mobile Node verifies that the registration reply was constructed by a valid Home Agent by verifying the authentication code in the MHAE using the Mobile-Home authentication key at 255.

Once the Mobile Node has verified that the registration reply was constructed by a valid Home Agent, it sends a message such as a registration request message to the Foreign Agent indicating that the registration reply was constructed by a valid Home Agent. In accordance with one embodiment, this message is sent in the form of a new registration request message. For instance, the Mobile node may compose a registration request including the Foreign-Home key reply extension protected by both the MHAE and MFAE generated by the Mobile Node using the Mobile-Home authentication key and Mobile-Foreign authentication key recently generated, respectively. The Mobile Node then transmits this registration request at 256 to the Foreign Agent. If the Mobile Node cannot authenticate the registration reply that it has received from the Foreign Agent, it drops the registration reply and does not send any further messages. The Foreign Agent will thereafter delete the generated Mobile-Foreign and Mobile-Home authentication keys after a period of time.

As set forth above, a registration request message is transmitted by the Mobile Node to indicate that the registration reply was constructed by a valid Home Agent. However, it is important to note that other message types may be used to indicate that the registration reply was constructed by a valid Home Agent. Of course, in alternate embodiments, it is also possible to send a message indicating that the registration reply was not constructed by a valid Home Agent.

When the Foreign Agent receives the acknowledgement message (e.g., registration request) from the Mobile Node at 258, it has now received notification that the previous registration reply was constructed by a valid Home Agent. The Foreign Agent then validates the MFAE using the Mobile-Foreign authentication key to ensure that the acknowledgement message was received by a valid Mobile Node. In other words, when the Foreign Agent has successfully authenticated the MFAE, the MHAE was successfully authenticated by the Mobile Node. The Foreign Agent may then activate the Foreign-Home authentication key (or security association) after the acknowledgement message has been received from the Mobile Node. Alternatively, the Foreign Agent may generate the Foreign-Home authentication key at this time.

As described above, the acknowledgement message may be a registration request message. In accordance with one embodiment, the registration request message includes a Time To Live field having a value of 1. When the Foreign Agent determines that the Time To Live field has a value equal to 1, the Foreign Agent recognizes that the purpose of this second registration request is merely to indicate that the Foreign Agent is to generate or activate the Foreign-Home authentication key (and that the Mobile-Foreign key generation by the Mobile Node was successful). Thus, when the second registration request has a Time To Live field having a value of 1, the Foreign Agent drops the second registration request message without forwarding the second registration message to the Home Agent.

Figure 3:
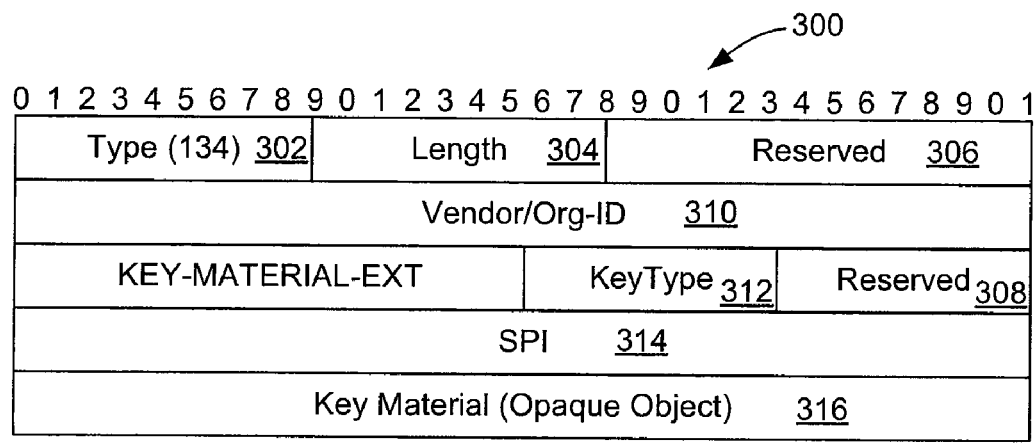
FIG. 3 is a diagram illustrating an exemplary key material extension that may be appended to registration request and reply packets in accordance with one embodiment of the invention.

As set forth above, Mobile-Foreign and Foreign-Home key request and key reply extensions may be appended to the registration request/reply packets in accordance with various embodiments of the invention to transmit key material among the Mobile Node, Home Agent, and Foreign Agent. FIG. 3 is a diagram illustrating an exemplary key material extension 300 that may be appended to registration request and reply packets in accordance with one embodiment of the invention. The key material extension (e.g., key request or reply extension) 300 may include a type field indicating that the extension is a key material extension at 302. The key material extension 300 may also include a length field 304 indicating a length of the extension, as well as a reserved field(s) 306, 308. The key material extension may also include a vendor/organization identifier 310. In this example, the key material extension 300 further includes a key type 312 indicating that the type of the key material carried by the extension is either Mobile-Foreign or Foreign-Home authentication material. The key material extension 300 also includes an SPI 314 to be used to identify a security association and key material 316 to be used to generate an authentication key of the security association. As set forth above, the key material may be generated according to the Diffie-Hellman key generation scheme.

The invention can also be embodied as computer readable code on a computer readable medium. The computer readable medium is any data storage device that can store data which can thereafter be read by a computer system. Examples of the computer readable medium include read-only memory, random-access memory, CD-ROMs, magnetic tape, and optical data storage devices.

The apparatus (e.g. Mobile Node, Mobile Router, Home Agent, or Foreign Agent) of this invention may be specially constructed for the required purposes, or may be a general purpose programmable machine selectively activated or reconfigured by a computer program stored in memory. The processes presented herein are not inherently related to any particular router or other apparatus. In a preferred embodiment, any of the Home and Foreign Agents of this invention may be specially configured routers such as specially configured router models 1700, 1800, 2500, 2600, 3200, 3600, 4000, 4500, 4700, 7200, and 7500 available from Cisco Systems, Inc. of San Jose, Calif. In addition, in a preferred embodiment, any of the Access Points of this invention may be specially configured routers such as specially configured router models 350, 1100, 1200 and 1400 available from Cisco Systems, Inc. of San Jose, Calif. Moreover, in a preferred embodiment, the Mobile Router of this invention may be a specially configured router such as specially configured router model 3200 available from Cisco Systems, Inc. of San Jose, Calif. A general structure for some of these machines will appear from the description given below.

Generally, the dynamic key generation techniques of the present invention may be implemented on software and/or hardware. For example, it can be implemented in an operating system kernel, in a separate user process, in a library package bound into network applications, on a specially constructed machine, or on a network interface card. In a specific embodiment of this invention, the technique of the present invention is implemented in software such as an operating system or in an application running on an operating system.

A software or software/hardware hybrid route optimization system of this invention is preferably implemented on a general-purpose programmable machine selectively activated or reconfigured by a computer program stored in memory. Such programmable machine may be a network device designed to handle network traffic. Such network devices typically have multiple network interfaces including frame relay, ISDN, and wireless interfaces, for example. Specific examples of such network devices include routers and switches. For example, the roaming systems of this invention may be specially configured routers such as specially configured router models 350, 1100, 1200, 1400, 1600, 2500, 2600, 3200, 3600, 4500, 4700, 7200, 7500, and 12000 available from Cisco Systems, Inc. of San Jose, Calif. A general architecture for some of these machines will appear from the description given below. In an alternative embodiment, the route optimization system may be implemented on a general-purpose network host machine such as a personal computer or workstation. Further, the invention may be at least partially implemented on a card (e.g., an interface card) for a network device or a general-purpose computing device.

Figure 4:
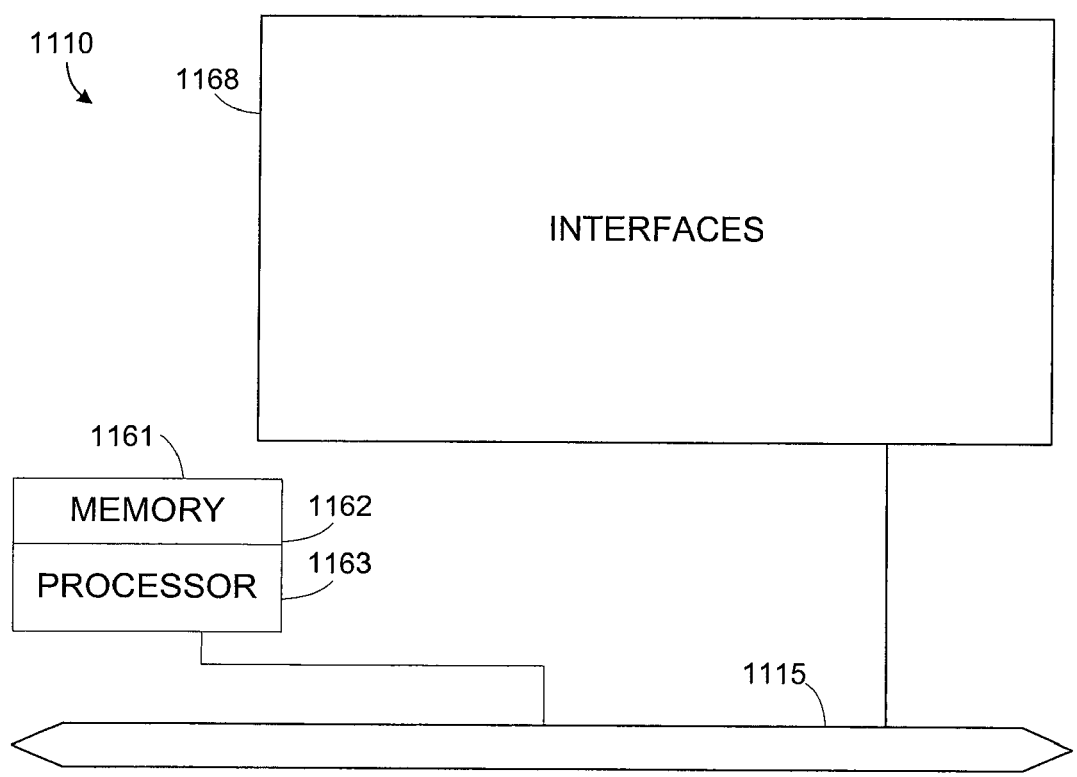
FIG. 4 is a diagrammatic representation of a router in which embodiments of the present invention may be implemented.

Referring now to FIG. 4, a router 1110 suitable for implementing the present invention includes a master central processing unit (CPU) 1162, interfaces 1168, and a bus 1115 (e.g., a PCI bus). When acting under the control of appropriate software or firmware, the CPU 1162 is responsible for such router tasks as routing table computations and network management. It may also be responsible for updating mobility binding and visitor tables, etc. It preferably accomplishes all these functions under the control of software including an operating system (e.g., the Internetwork Operating System (IOS®) of Cisco Systems, Inc.) and any appropriate applications software. CPU 1162 may include one or more processors 1163 such as a processor from the Motorola family of microprocessors or the MIPS family of microprocessors. In an alternative embodiment, processor 1163 is specially designed hardware for controlling the operations of router 1110. In a specific embodiment, a memory 1161 (such as non-volatile RAM and/or ROM) also forms part of CPU 1162. However, there are many different ways in which memory could be coupled to the system.

The interfaces 1168 are typically provided as interface cards (sometimes referred to as "line cards"). Generally, they control the sending and receiving of data packets over the network and sometimes support other peripherals used with the router 1110. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 1162 to efficiently perform routing computations, network diagnostics, security functions, etc.

Although the system shown in FIG. 4 is one specific router of the present invention, it is by no means the only router architecture on which the present invention can be implemented. For example, an architecture having a single processor that handles communications as well as routing computations, etc. is often used. Further, other types of interfaces and media could also be used with the router.

Regardless of network device's configuration, it may employ one or more memories or memory modules (including memory 1161) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc.

Because such information and program instructions may be employed to implement the systems/methods described herein, the present invention relates to machine-readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). The invention may also be embodied in a carrier wave traveling over an appropriate medium such as airwaves, optical lines, electric lines, etc. Examples of program instructions include both machine code, such as produced by a compiler, and files containing higher level code that may be executed by the computer using an interpreter.

Although the foregoing invention has been described in some detail for purposes of clarity of understanding, it will be apparent that certain changes and modifications may be practiced within the scope of the appended claims. For instance, the disclosed message formats are merely illustrative, and therefore other messages may be used to initiate and accomplish the generation of the Mobile-Foreign and Foreign-Home authentication keys. For instance, although the scheme used to generate key material exchanged between two parties and generate the authentication keys in the above-disclosed embodiments is the Diffie-Hellman key exchange scheme, other schemes may be applied. Moreover, although the key material is exchanged via registration request and reply packets, other message types may be used to transmit key material among two or more parties. Similarly, although such messages are used in some embodiments of the invention to support indirect communication between the Foreign Agent, Home Agent, and/or Mobile Node, messages may also be used to support direct communication between the entities. Moreover, although the example described refers to Ipv4, the present invention may be used with IP addresses that conform to other versions of IP. Therefore, the described embodiments should be taken as illustrative and not restrictive, and the invention should not be limited to the details given herein but should be defined by the following claims and their full scope of equivalents.

What is claimed is:

1. A Foreign Agent supporting Mobile IP and adapted for generating an authentication key to be shared between the Foreign Agent and a Home Agent, comprising:
  a processor; and
  a memory, at least one of the processor or the memory being adapted for:
  receiving by the Foreign Agent supporting Mobile IP a first key material generated by the Home Agent, thereby enabling the Foreign Agent to generate a Foreign-Home authentication key shared between the Foreign Agent and the Home Agent;
  dynamically generating by the Foreign Agent a second key material;
  transmitting by the Foreign Agent the second key material such that it is received by the Home Agent, thereby enabling the Home Agent to generate a Foreign-Home authentication key shared between the Home Agent and the Foreign Agent;
  dynamically generating by the Foreign Agent the Foreign-Home authentication key shared between the Home Agent and the Foreign Agent from the first key material;
  wherein dynamically generating the second key material includes computing the value of $Y=(g^y) \mod n$, wherein y is a random integer, wherein Y is the second key material, and both g and n are group parameters that are universally known to the Mobile Node, Foreign Agent, and Home Agent; and
  wherein dynamically generating the Foreign-Home authentication key shared between the Home Agent and the Foreign Agent includes computing the value $k=(X^y)$ mod n, wherein X is the first key material received from the Home Agent, wherein k is the Foreign-Home authentication key.

2. The Foreign Agent as recited in claim 1, wherein transmitting the second key material comprises transmitting the second key material to the Home Agent.

3. The Foreign Agent as recited in claim 1, wherein transmitting the second key material comprises broadcasting the second key material.

4. A Foreign Agent supporting Mobile IP and adapted for generating an authentication key to be shared between a Mobile Node and the Foreign Agent to which the Mobile Node has roamed, comprising:
   a processor; and
   a memory, at least one of the processor or the memory being adapted for:
   receiving by the Foreign Agent supporting Mobile IP a first key material generated by the Mobile Node, thereby enabling the Foreign Agent to generate a Mobile-Foreign authentication key shared between the Mobile Node and the Foreign Agent;
   dynamically generating a second key material by the Foreign Agent;
   transmitting the second key material by the Foreign Agent to the Mobile Node, thereby enabling the Mobile Node to generate a Mobile-Foreign authentication key shared between the Mobile Node and the Foreign Agent; and
   dynamically generating the Mobile-Foreign authentication key shared between the Mobile Node and the Foreign Agent from the first key material by the Foreign Agent;
   wherein dynamically generating the second key material includes computing the value of $Y=(g^y)$ mod n, wherein y is a random integer, wherein Y is the second key material, and both g and n are group parameters that are universally known to the Mobile Node, Foreign Agent, and Home Agent; and
   wherein dynamically generating the Mobile-Foreign authentication key shared between the Mobile Node and the Foreign Agent includes computing the value $k=(X^y)$ mod n, wherein X is the first key material received from the Mobile Node, wherein k is the Mobile-Foreign authentication key.

5. The Foreign Agent as recited in claim 4, at least one of the processor or the memory being further adapted for:
   determining whether the Foreign Agent shares an authentication key with the Home Agent;
   when the Foreign Agent does not share an authentication key with the Home Agent, transmitting a request for a Foreign-Home authentication key.

6. The Foreign Agent as recited in claim 5, at least one of the processor or the memory being further adapted for:
   receiving key material generated by the Home Agent; and
   generating a Foreign-Home authentication key from the key material generated by the Home Agent.

7. A Foreign Agent supporting Mobile IP and adapted for generating a Mobile-Foreign authentication key to be shared between a Mobile Node and the Foreign Agent and a Foreign-Home authentication key to be shared between the Foreign Agent and a Home Agent, comprising:
   a processor; and
   a memory, at least one of the processor or the memory being adapted for:
   receiving by the Foreign Agent supporting Mobile IP a first key material generated by the Mobile Node, thereby enabling the Foreign Agent to generate a Mobile-Foreign authentication key shared between the Mobile Node and the Foreign Agent;
   dynamically generating by the Foreign Agent a second key material;
   transmitting by the Foreign Agent the second key material to the Mobile Node, thereby enabling the Mobile Node to generate a Mobile-Foreign authentication key shared between the Mobile Node and the Foreign Agent;
   dynamically generating by the Foreign Agent the Mobile-Foreign authentication key shared between the Mobile Node and the Foreign Agent from the first key material;
   receiving by the Foreign Agent a third key material generated by the Home Agent, thereby enabling the Foreign Agent to generate a Foreign-Home authentication key shared between the Home Agent and the Foreign Agent;
   dynamically generating by the Foreign Agent a fourth key material;
   transmitting by the Foreign Agent the fourth key material to the Home Agent, thereby enabling the Home Agent to generate a Foreign-Home authentication key shared between the Home Agent and the Foreign Agent; and
   dynamically generating by the Foreign Agent the Foreign-Home authentication key shared between the Home Agent and the Foreign Agent from the third key material;
   wherein dynamically generating the second key material includes computing the value of $Y=(g^y)$ mod n, wherein y is a random integer, wherein Y is the second key material, and both g and n are group parameters that are universally known to the Mobile Node, Foreign Agent, and Home Agent; and
   wherein dynamically generating the Mobile-Foreign authentication key shared between the Mobile Node and the Foreign Agent includes computing the value $k=(X^y)$ mod n, wherein X is the first key material received from the Mobile Node, wherein k is the Mobile-Foreign authentication key.

8. The Foreign Agent as recited in claim 7, at least one of the processor or the memory being further adapted for:
   generating an ICMP Router Discovery Protocol (IRDP) router advertisement message including the second key material;
   wherein transmitting the second key material to the Mobile Node comprises transmitting the IRDP router advertisement message to the Mobile Node.

9. The Foreign Agent as recited in claim 7, wherein the Mobile-Foreign authentication key and the Foreign-Home authentication key are generated using the Diffie-Hellman Key Exchange scheme.

10. The Foreign Agent as recited in claim 7, at least one of the processor or the memory being further adapted for:
    receiving a first registration request from the Mobile Node, the first registration request having a Mobile-Foreign key request extension including the first key material and indicating a request to generate a key between the Mobile Node and the Foreign Agent;
    sending a first registration reply to the Mobile Node, the first registration reply having a Foreign-Home key request extension including the fourth key material and indicating a request for the Home Agent to generate a key between the Foreign Agent and the Home Agent;
    receiving a second registration request from the Mobile Node including the Mobile-Foreign key request extension and the Foreign-Home key request extension;
    forwarding the second registration request to the Home Agent;
    receiving a second registration reply from the Home Agent, the second registration reply having a Foreign-Home key reply extension including the third key material;

appending a Mobile-Foreign key reply extension including the second key material to the second registration reply; and forwarding the second registration reply to the Mobile Node.

11. The Foreign Agent as recited in claim 10, wherein the Mobile-Foreign key request extension, the Foreign-Home key request extension, the Mobile-Foreign key reply extension and the Foreign-Home key reply extension each includes a Security Parameter Index (SPI).

12. The Foreign Agent as recited in claim 10, at least one of the processor or the memory being further adapted for:
   determining whether the second registration reply indicates that the Home Agent has accepted the registration of the Mobile Node with the Home Agent;
   when it is determined that the Home Agent has accepted the registration of the Mobile Node with the Home Agent, obtaining the Foreign-Home key reply extension from the second registration reply and obtaining the third key material from the Foreign-Home key reply extension, thereby enabling the Foreign Agent to generate the Foreign-Home authentication key.

13. The Foreign Agent as recited in claim 12, at least one of the processor or the memory being further adapted for:
   when it is determined that the Home Agent has accepted the registration of the Mobile Node with the Home Agent, generating the Mobile-Foreign authentication key from the third key material.

14. The Foreign Agent as recited in claim 7, at least one of the processor or the memory being further adapted for:
   activating the Foreign-Home authentication key.

15. In a Home Agent supporting Mobile IP, a method of performing registration of a Mobile Node visiting a Foreign Agent, comprising:
   receiving by the Home Agent a registration request including a Foreign-Home key request extension and identifying a Mobile Node, the Foreign-Home key request extension including key material generated by the Foreign Agent and indicating a request for the Home Agent to generate a key between the Foreign Agent and the Home Agent;
   dynamically generating by the Home Agent a Foreign-Home authentication key shared between the Home Agent and the Foreign Agent from the key material obtained from the Foreign-Home key request extension, wherein generating the Foreign-Home authentication key shared between the Foreign Agent and the Home Agent from the key material obtained from the Foreign-Home key request extension is performed by computing the value $k=(Y^x)$ mod n, wherein Y is the key material obtained from the Foreign-Home key request extension, wherein k is the Foreign-Home authentication key;
   generating by the Home Agent key material to be provided in a Foreign-Home key reply extension by computing the value of $X=(g^x)$ mod n, wherein x is a random integer, wherein X is the key material generated by the Home Agent, and both g and n are group parameters that are universally known to the Mobile Node, Foreign Agent and the Home Agent;
   composing by the Home Agent a registration reply including a Foreign-Home key reply extension including the key material generated by the Home Agent; and
   sending by the Home Agent the registration reply to the Foreign Agent, the registration reply indicating success or failure of the registration of the Mobile Node with the Foreign Agent.

16. The method as recited in claim 15, wherein the registration request and registration reply further includes a Mobile-Foreign key request extension, the Mobile-Foreign key request extension including key material generated by the Mobile Node and indicating a request to generate a key between the Mobile Node and the Foreign Agent.

17. The method as recited in claim 15, wherein the registration request further includes a Mobile-Home Authentication Extension, the method further comprising:
   verifying the Mobile-Home Authentication Extension to determine whether the Foreign-Home key request extension was modified; and
   composing the Foreign-Home key reply extension when it is determined that the Foreign-Home key request extension was not modified.

18. The method as recited in claim 15, wherein the Foreign-Home authentication key is generated according to the Diffie-Hellman key exchange scheme.

19. The method as recited in claim 15, further comprising:
   generating key material; and
   providing the key material generated by the Home Agent in the Foreign-Home key reply extension of the registration reply.

20. The method as recited in claim 15, further comprising:
   generating key material according to the Diffie-Hellman key exchange scheme; and
   providing the key material generated by the Home Agent in the Foreign-Home key reply extension of the registration reply.

21. The method as recited in claim 15, wherein the key material in the Foreign-Home key request extension and the key material in the Foreign-Home key reply extension are generated according to the Diffie-Hellman key exchange scheme.

22. A Home Agent supporting Mobile IP, comprising:
   a processor; and
   a memory, at least one of the processor or the memory being adapted for:
   receiving by the Home Agent a registration request including a Foreign-Home key request extension and identifying a Mobile Node, the Foreign-Home key request extension including key material generated by a Foreign Agent and indicating a request for the Home Agent to generate a key between the Foreign Agent and the Home Agent;
   dynamically generating by the Home Agent a Foreign-Home authentication key shared between the Home Agent and the Foreign Agent from the key material obtained from the Foreign-Home key request extension, wherein generating the Foreign-Home authentication key shared between the Foreign Agent and the Home Agent from the key material obtained from the Foreign-Home key request extension is performed by computing the value $k=(Y^x)$ mod n, wherein Y is the key material obtained from the Foreign-Home key request extension, wherein k is the Foreign-Home authentication key;
   generating by the Home Agent key material to be provided in a Foreign-Home key reply extension by computing the value of $X=(g^x)$ mod n, wherein x is a random integer, wherein X is the key material generated by the Home Agent, and both g and n are group parameters that are universally known to the Mobile Node, Foreign Agent and the Home Agent;
   composing by the Home Agent a registration reply including a Foreign-Home key reply extension including the key material generated by the Home Agent; and sending by the Home Agent the registration reply to the Foreign Agent, the registration reply indicating success or failure of the registration of the Mobile Node with the Foreign Agent.

23. The Home Agent as recited in claim 22, wherein the registration request and registration reply further includes a Mobile-Foreign key request extension, the Mobile-Foreign key request extension including key material generated by the Mobile Node and indicating a request to generate a key between the Mobile Node and the Foreign Agent.

\* \* \* \* \*